May 22, 1923.

T. CARMICHAEL

HOG WATERING TROUGH

Filed Feb. 1, 1922

Inventor
THURMAN CARMICHAEL

By J. Kaplan
Attorney

May 22, 1923.

T. CARMICHAEL

HOG WATERING TROUGH

Filed Feb. 1, 1922

Inventor
THURMAN CARMICHAEL
By J. Kaplan

Patented May 22, 1923.

1,455,989

UNITED STATES PATENT OFFICE.

THURMAN CARMICHAEL, OF MARYVILLE, MISSOURI.

HOG-WATERING TROUGH.

Application filed February 1, 1922. Serial No. 533,317.

*To all whom it may concern:*

Be it known that I, THURMAN CARMICHAEL, a citizen of the United States, and a resident of Maryville, in the county of Nodaway, in the State of Missouri, have invented new and useful Improvements in Hog-Watering Troughs, of which the following is a specification.

This invention relates to improvements in a combination hog waterer and heater.

The object of the present invention is to improve the construction of automatic watering troughs, and to provide a simple, inexpensive and efficient hog waterer, equipped with a trough and adapted to be constructed of sufficient size to permit cattle to drink therefrom.

With this object in view, the invention consists in the construction and novel combination of parts hereinafter fully described, illustrated in the accompanying drawings and pointed out in the claim hereto appended, it being understood that various changes in the form, proportion, size and minor details of construction, within the scope of the claim, may be resorted to without departing from the spirit of the invention.

In the drawings.

Like numerals of reference designate corresponding parts in all the figures of the drawings.

Figure 1:
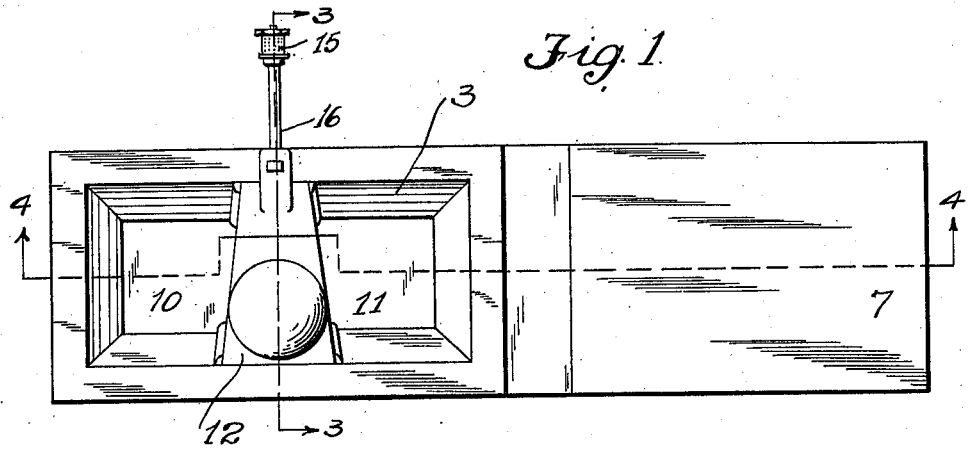
Figure 1 is a top view of the hog waterer, constructed in accordance with this invention.
Figure 2:
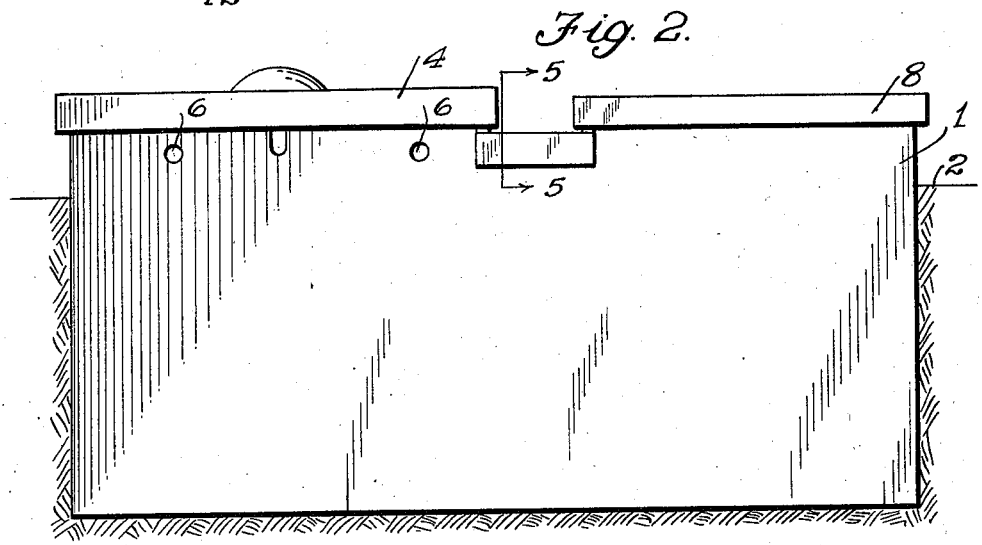
Figure 2 is a front elevation of the device.

In the accompanying drawings in which is illustrated, the preferred embodiment of the invention, 1 designates a box-like casing, part of which is set below the ground line 2, so as to retain all the heat possible. A watering trough 3 is placed in the casing 1 as shown in Figure 1. This watering trough is provided with flanges 4 so as to prevent any water from the trough entering the casing 1, and also to provide a convenient support for the trough.

A lamp 5 is placed directly underneath the drinking trough so as to heat the water therein and prevent same from freezing, and also to maintain the water in a good drinking condition. The products of combustion from lamp 5 pass upward and out to the atmosphere through the vent holes 6, formed at opposite sides of the casing. 7 is a cover formed with flanges 8, which fits over opening 9 of casing 1, so the lamp can be accessible.

The watering trough 3 is formed in two compartments, 10 and 11. In the center is a housing 12, which fits over and guards the inlet valve operating mechanism. The walls of housing 12, do not touch the bottom of the trough, thereby leaving spaces 13 so the water can pass from compartment 10 to 11, or vice versa.

Figure 3:
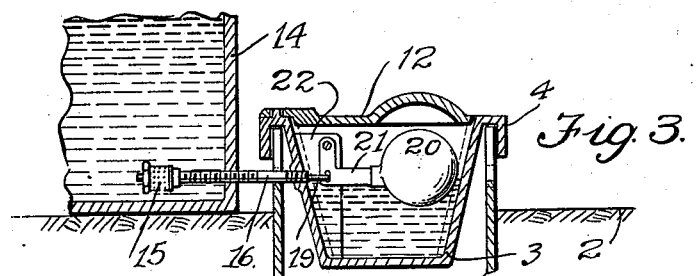
Figure 3 is a section on line 3—3 of Figure 1.
Figure 3:
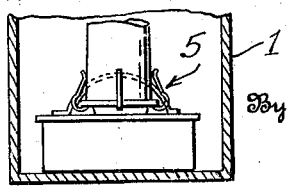
Figure 4:
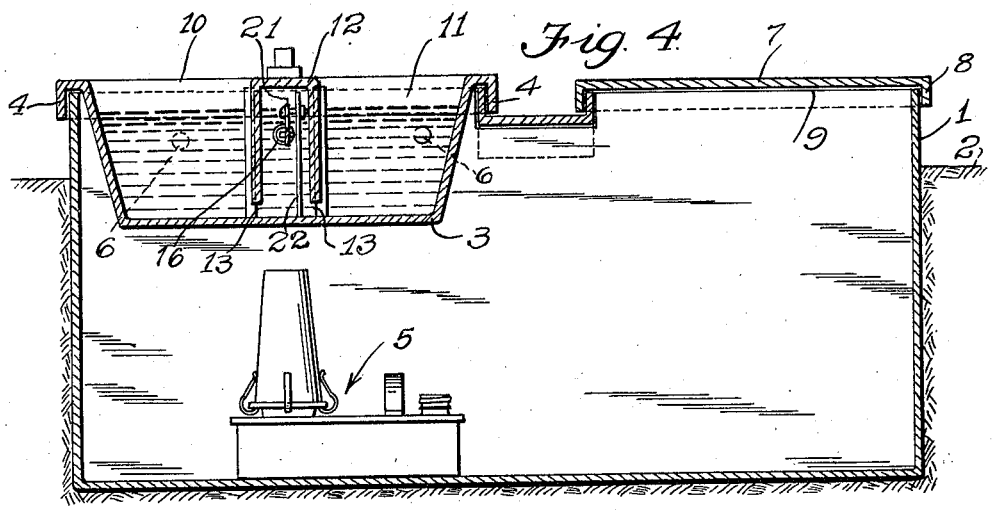
Figure 4 is a section on line 4—4 of Figure 1.
Figure 5:
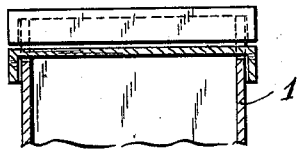
Figure 5 is a section on line 5—5 of Figure 2.
Figure 6:
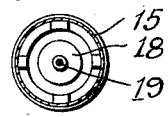
Figure 6 is a section on line 6—6 of Figure 7.

The top surface of housing 12 is somewhat domed, as shown in Figure 3. This domed portion forms a proper receptacle for float 20, as said float reaches its highest level.

The water supply in the trough comes from an ordinary stock watering tank 14, through an inlet pipe 16, having a filter 15. Before the water enters the trough, it is filtered through filter 15. This filter is cylindrical in form with a series of ribs running horizontally, on which a screen of fine wire mesh is permanently fastened for the purpose of keeping out foreign matter. One end of the filter is screwed onto pipe 16. The inside diameter of this pipe, where it screws into the filter, is narrowed to form a seat 17, to co-act with the disc 18. On the other end of the filter is an opening into which the rod 19, on which disc 18, is fastened, can loosely slide to open and close the valve (see Figure 7).

Figure 7:
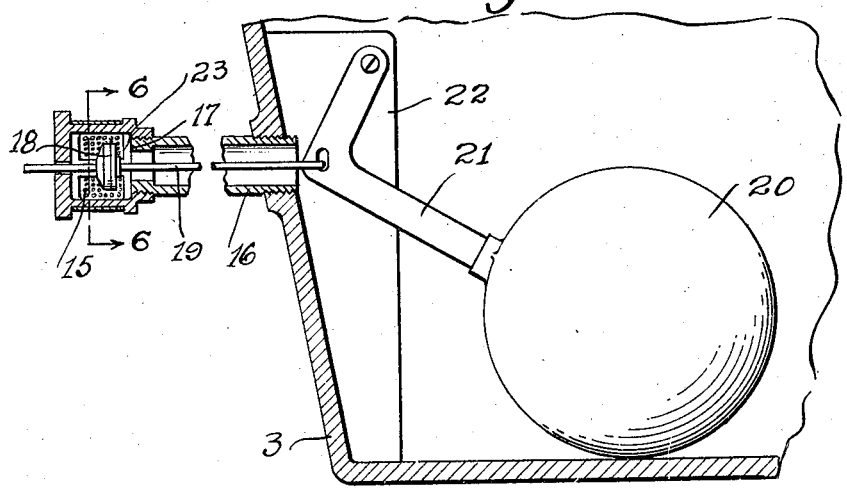
Figure 7 shows the automatic inlet valve and operating mechanism.

The regulation of the water supply in the trough is caused by a float 20, which rises and falls with the height of the water in the trough. In Figure 7, the float 20 is shown at its lowest position and the disk 18 fully opened. When a sufficient amount of water is in the trough, the float will rise and, through bell crank 21, pivotally mounted on support or rib 22, cause disk 18, mounted on rod 19, to close the opening 23 and shut off the water supply. Rib 22 is formed integrally with the trough.

The operation will be obvious from the above description. It may, however, be noted that the device is so constructed as to be easily assembled, of a few and simple parts, and is thus inexpensive and very effective for its purpose.

Claim—

In a device of the class described, in combination, a liquid receptacle, an inlet pipe to said receptacle, a filter having one end secured to said inlet pipe, the other end of said filter being provided with a bearing opening, a valve rod extending through said filter and pipe and reciprocally mounted in the opening, a valve seat formed by narrowing the mouth of said inlet pipe adjacent the said filter, a valve disc permanently fastened to said valve rod and adapted to coact with the seat for opening and closing the valve, said filter including ribs onto which a screen of fine mesh is permanently fastened for the purpose of keeping out foreign matter, and float means to actuate the said valve.

In testimony whereof I affix my signature.

THURMAN CARMICHAEL.